United States Patent
Lai et al.

(10) Patent No.: US 6,854,281 B1
(45) Date of Patent: Feb. 15, 2005

(54) CHECK DEVICE FOR AN AIR CONDITIONING SYSTEM OF AN AUTOMOBILE AND AN AIR CONDITIONER COMPRESSOR

(75) Inventors: Chin Laing Lai, Ping Tung (TW); Man Chih Chang, Pusin Township, Changhua County (TW)

(73) Assignee: He Jhang Environmental Technology Co., Ltd., Taichung (TW)

( * ) Notice: Subject to any disclaimer, the term of this patent is extended or adjusted under 35 U.S.C. 154(b) by 0 days.

(21) Appl. No.: 10/642,726

(22) Filed: Aug. 19, 2003

(51) Int. Cl.$^7$ .............................................. G01K 13/00
(52) U.S. Cl. ........................................ 62/129; 62/470
(58) Field of Search ........................ 62/129, 298, 299, 62/498, 470, 196.4

(56) References Cited

U.S. PATENT DOCUMENTS

| | | | | |
|---|---|---|---|---|
| 3,873,289 A | * | 3/1975 | White ........................ | 62/149 |
| 5,357,763 A | * | 10/1994 | Vogel ........................ | 62/77 |
| 5,927,087 A | * | 7/1999 | Ishikawa ................... | 62/174 |
| 6,176,093 B1 | * | 1/2001 | Stein et al. ................ | 62/85 |
| 6,422,310 B2 | * | 7/2002 | Egara ........................ | 165/281 |
| 6,449,973 B2 | * | 9/2002 | Dodge et al. .............. | 62/240 |
| 6,470,695 B2 | * | 10/2002 | Gong ......................... | 62/129 |
| 6,637,226 B2 | * | 10/2003 | Watanabe et al. .......... | 62/201 |
| 6,640,567 B2 | * | 11/2003 | Kim et al. .................. | 62/199 |

FOREIGN PATENT DOCUMENTS

DE 4233390 A1 * 4/1994
DE 019737869 A1 * 3/1999

* cited by examiner

Primary Examiner—William E. Tapolcai
Assistant Examiner—Mohammad M. Ali
(74) Attorney, Agent, or Firm—Rosenberg, Klein & Lee

(57) ABSTRACT

A check device for an air conditioning system of an automobile and an air conditioner compressor includes a first path for containing coolant flowing therein. An air conditioner compressor, a condenser, an inflate valve and an evaporator are sequentially mounted to the first path to divided the first path. Two opposite ends of the first path respectively connected to a high-pressure outlet and a low-pressure inlet of the air conditioner compressor. Two pressure gauges are respectively mounted to the first path, one before the air conditioner compressor and the other after the air conditioner compressor relative to the flowing direction of the coolant in the first path for showing the difference of the pressure value of the coolant between passing before the air conditioner compressor and passing after the air conditioner compressor.

12 Claims, 4 Drawing Sheets

CHECK DEVICE FOR AN AIR CONDITIONING SYSTEM OF AN AUTOMOBILE AND AN AIR CONDITIONER COMPRESSOR

BACKGROUND OF THE INVENTION

1. Field of the Invention

The present invention relates to a check device, and more particularly to a check device for an air conditioning system of an automobile and an air conditioner compressor.

2. Description of Related Art

As usual, the air conditioning system of an automobile comprises a closed coolant path for containing the coolant circuitously circulated in the coolant path. An air conditioner compressor, a condenser, a inflate valve and an evaporator sequentially disposed on the closed coolant path. A drying device is further connected to the condenser. In operating, the coolant executes a heat exchange in the evaporator and a fan blows the cool air into the automobile. The above air conditioning system may lose its cooling effect due to a block or leaking coolant.

According to the block of the coolant path, the reasons are the path containing too much water and oil, or the element of the air conditioning system worn. The repairer needs to confirm where the block situated before repairing the air conditioning system.

The repairer reads the pressure value from a high-pressure gauge and a low-pressure gauge that are connected to the coolant path and respectively situated before the air conditioner compressor and after the air conditioner compressor. Then, the repairer determines that the block is situated on a high-pressure section or the low-pressure section by his/her experience.

However, an error is hardly to avoid when determining a problem only by his/her experience. Furthermore, an invisible experience cannot be inherited well.

The present invention has arisen to mitigate and/or obviate the disadvantages of the conventional check device for an air conditioning system and an air conditioner compressor of an automobile.

SUMMARY OF THE INVENTION

The main objective of the present invention is to provide an improved check device for an air conditioning system of an automobile and an air conditioner compressor. The check device of the present invention can accurately and quickly find a block in the air conditioning system.

To achieve the objective, the check device for an air conditioning system of an automobile and an air conditioner compressor in accordance with the present invention comprises a first path for containing coolant flowing therein. An air conditioner compressor, a condenser, an inflate valve and an evaporator are sequentially mounted to the first path to divided the first path. Two opposite ends of the first path respectively connected to a high-pressure outlet and a low-pressure inlet of the air conditioner compressor. Two pressure gauges are respectively mounted to the first path, one before the air conditioner compressor and the other after the air conditioner compressor relative to the flowing direction of the coolant in the first path for showing the difference of the pressure value of the coolant between passing before the air conditioner compressor and passing after the air conditioner compressor.

Further benefits and advantages of the present invention will become apparent after a careful reading of the detailed description with appropriate reference to the accompanying drawings.

DETAILED DESCRIPTION OF THE INVENTION

Figure 1:
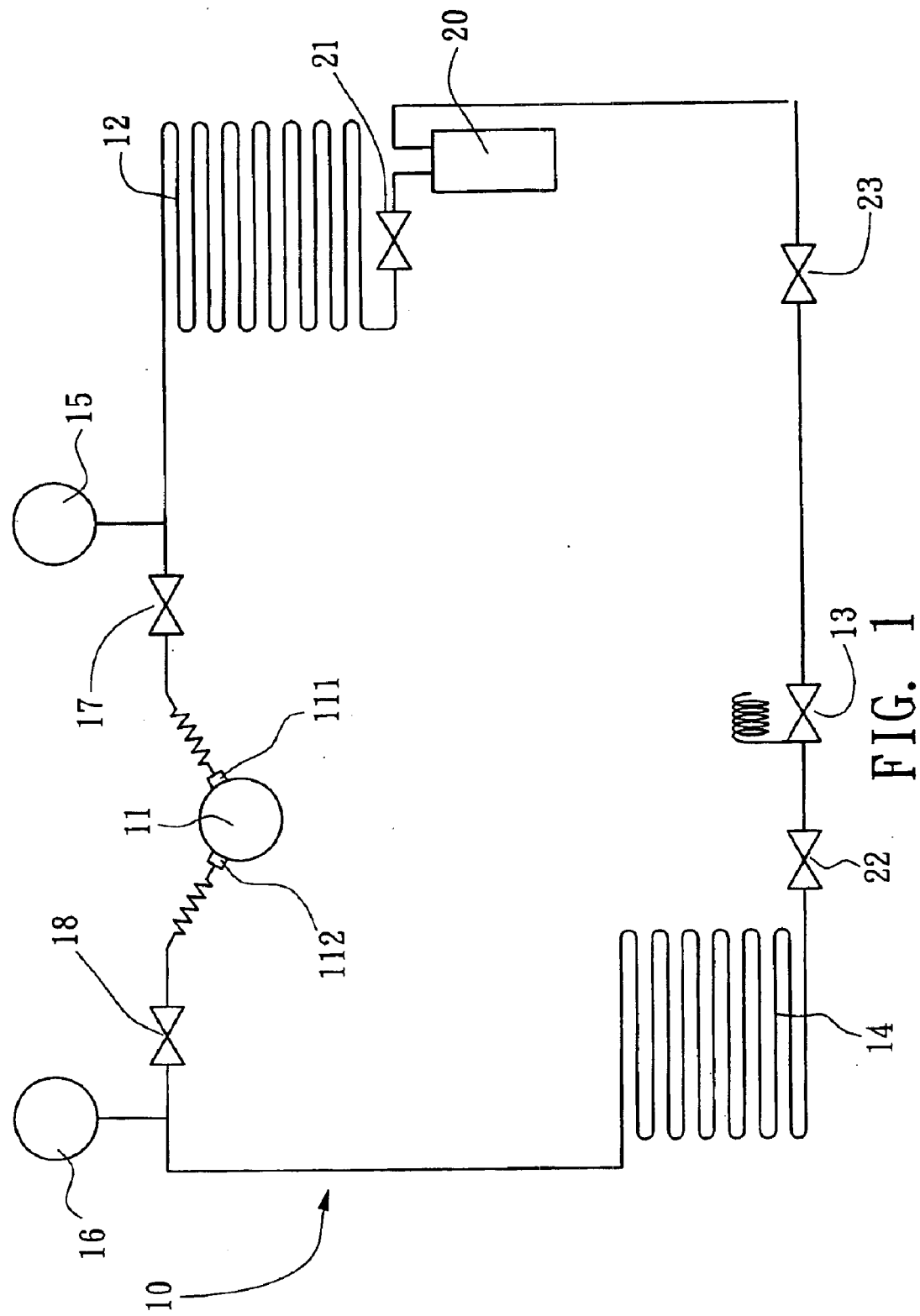
FIG. 1 is a detailed schematic diagram of a check device for an air conditioning system of an automobile and an air conditioner compressor in accordance with the present invention.

Referring to the drawings and initially to FIG. 1, a check device for an air conditioning system of an automobile and an air conditioner compressor in accordance with the present invention comprises a first path (10) has two opposite end respectively connected to a high-pressure outlet (111) and a low-pressure inlet (112) of an air conditioner compressor (11). A condenser (12), an inflate valve (13) and an evaporator (14) are sequentially mounted to the first path (10). The first path (10) is provided for coolant to circulate and form an interaction of air-phase and liquid-phase in the first path (10). A high-pressure gauge (15) and a low-pressure gauge (16) are respectively mounted on the high-pressure outlet (111) and the low-pressure inlet (112) of the air conditioner compressor (11) for showing the pressure value. A first valve (17) is mounted to the first path (10) between the high-pressure outlet (111) and the high-pressure gauge (15), and a second valve (18) is mounted to the first path (10) between the low-pressure inlet (112) and the low-pressure gauge (16) for closing the first path (10) when replacing the air conditioner compressor (11).

The check device of the present invention further comprises a drying device (20) mounted to the first path (10) between the condenser (12) and the inflate valve (13) for removing the mist in the first path (10). A first adjust valve (21) is mounted to the first path (10) between the condenser (12) and the drying device (20), a second adjust valve (22) is mounted to the first path (10) between the inflate valve (13) and the evaporator (14), and a third adjust valve (23) mounted to the fist path (10) between the drying device (20) and the inflate valve (13) for adjusting the pressure value read from the high-pressure gauge (15) and the low-pressure gauge (16).

In operation, the firth path (10) of the check device of the present invention is connected a air conditioner compressor that is mounted in the automobile waiting for repairing and the repairer reads and records the pressure values from the high-pressure gauge (15) an the low-pressure gauge (16). Continually, a good air conditioner compressor with a type the same as the air conditioner compressor of the repairing automobile is instead of the air conditioner compressor of the repairing automobile. The first adjust valve (21), the second adjust valve (22) and the third adjust valve (23) are adjusted to make the pressure values from the high-pressure gauge (15) and the low-pressure gauge (16) correspond to the recorded pressure values.

The first path (10) is divided into several high-pressure sections and low-pressure sections because the coolant in the first path (10) cause a interaction of air-phase and liquid-phase, and the pressure of the coolant is reduced when passing the elements on the first path (10). For example, the high-pressure section is formed between the air conditioner compressor (11) and the condenser (12), and the low-pressure section is formed between the evaporator (14) and the air conditioner compressor (11). The different of the high-pressure section and the low-pressure section is very clear.

The repairer can simulate where the block situated on the first path (10) by adjusting one of the three adjust valves (21, 22, 23). Consequently, the repairer can quickly determine where the block situated and decide to repair of replace the broken element. Conspicuously, the repairer can objectively and quickly make a decision by the concrete check device not by the invisible experience. Consequently, the check device in accordance with the present invention can overcome all the disadvantages of the conventional check device that only relies on the unreliable invisible experience of the repairer.

Figure 2:
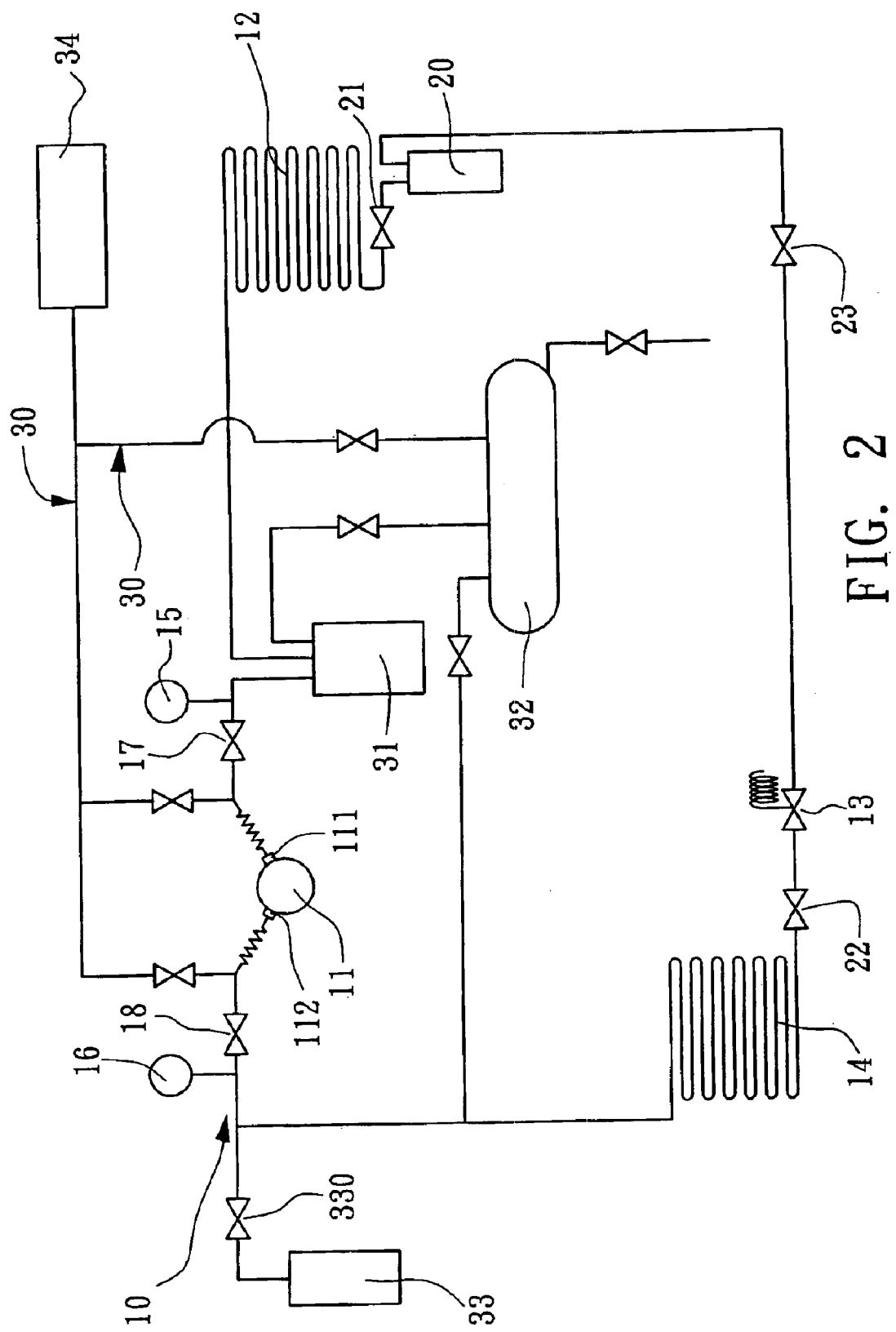
FIG. 2 is a detailed schematic diagram of a second embodiment of the check device of the present invention.

With reference to FIG. 2, the check device of the present invention further comprises an oil-separator (31) mounted to the first path (10) between the air conditioner compressor (11) and the condenser (12). An oil-container (32) is connected to and communicates with the oil-separator (31). A coolant supplier (33) is connected to and communicates with the first path (10) before the air conditioner compressor (11). An induced switch (330) is mounted to the first path (10) for selectively open the coolant supplier (33). A second path (30) communicates with the first path (10). The second path (30) has including first end, a middle section and a second end. The first end of the second path (30) has a pair of manifolds, one communicating with the first path (10) before the air conditioner compressor (11) and the other communicating with the first path (10) after the air conditioner compressor (11). The middle section of the second path (30) communicates with the oil-container (32) and the second end of the second path (30) communicates with the first path (10) after the evaporator (14) via the oil-container (32). A vacuum pump (34) is mounted to the second path (30) between the first end and the middle section of the second path (30).

The oil-separator (31) is provided to collect the oil in the first path (10) from the air conditioner compressor (11) and the collected oil is contained in the oil-container (32).

The induced switch (330) automatically starts when the check device of the present invention is operated for a certain time. The induced switch (330) actuates to allow the coolant flowing into the first path (10) from the coolant supplier (33) when the pressure value of the coolant in the first path (10) is lower than that of the setting value.

The vacuum pump (34) has two functions hereinafter. The vacuum pump (34) can draw out the remained air and mist in the air conditioner compressor (11) due to two valves adjacent to the air conditioner compressor (11) and two valves on the pair of manifolds of the first end of the second path (30). For smoothly draining the oil in the oil-container, the vacuum pump (34) brings the high pressure down to balance the pressure in the oil-separator (31) that load a high pressure from the air conditioner compressor (11).

Figure 3:
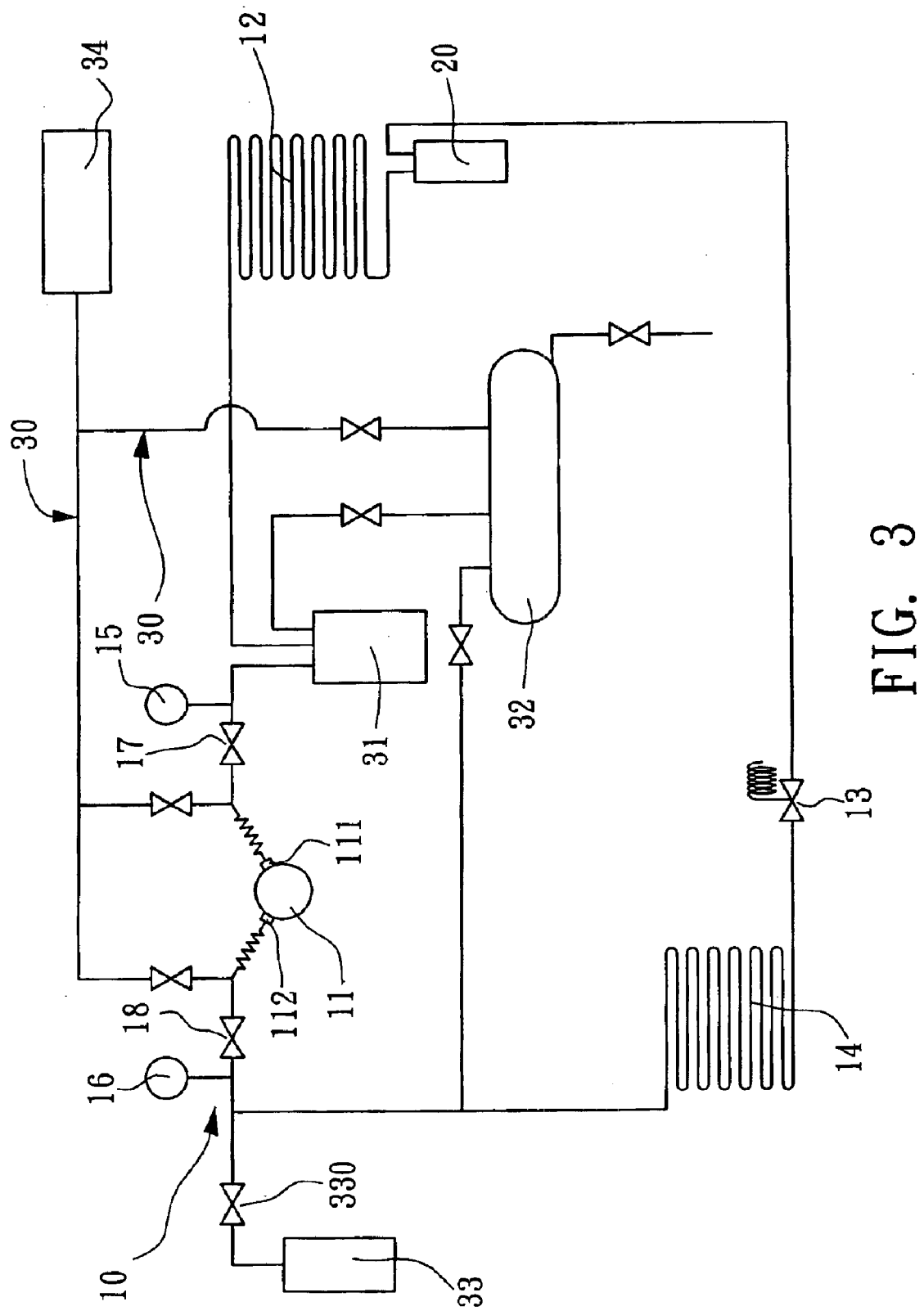
FIG. 3 is a detailed schematic diagram of a third embodiment of the check device of the present invention.

With reference to FIG. 3, a first quick-release joint (not shown) is mounted between the high-pressure outlet (111) and the high-pressure gauge (15), and a second quick-release joint (not shown) is mounted between the low-pressure inlet (112) and the low-pressure gauge (16) for quickly dismounting the air conditioner compressor (11) form the first path (11).

The operator can read the pressure values from the high-pressure gauge (15) and the low-pressure gauge (16) and compare with the previously set pressure values to determine whether air conditioner compressor (11) is in a right condition or not when the first path (10) is in a normal condition and the air conditioner compressor (11) is in operating.

Figure 4:
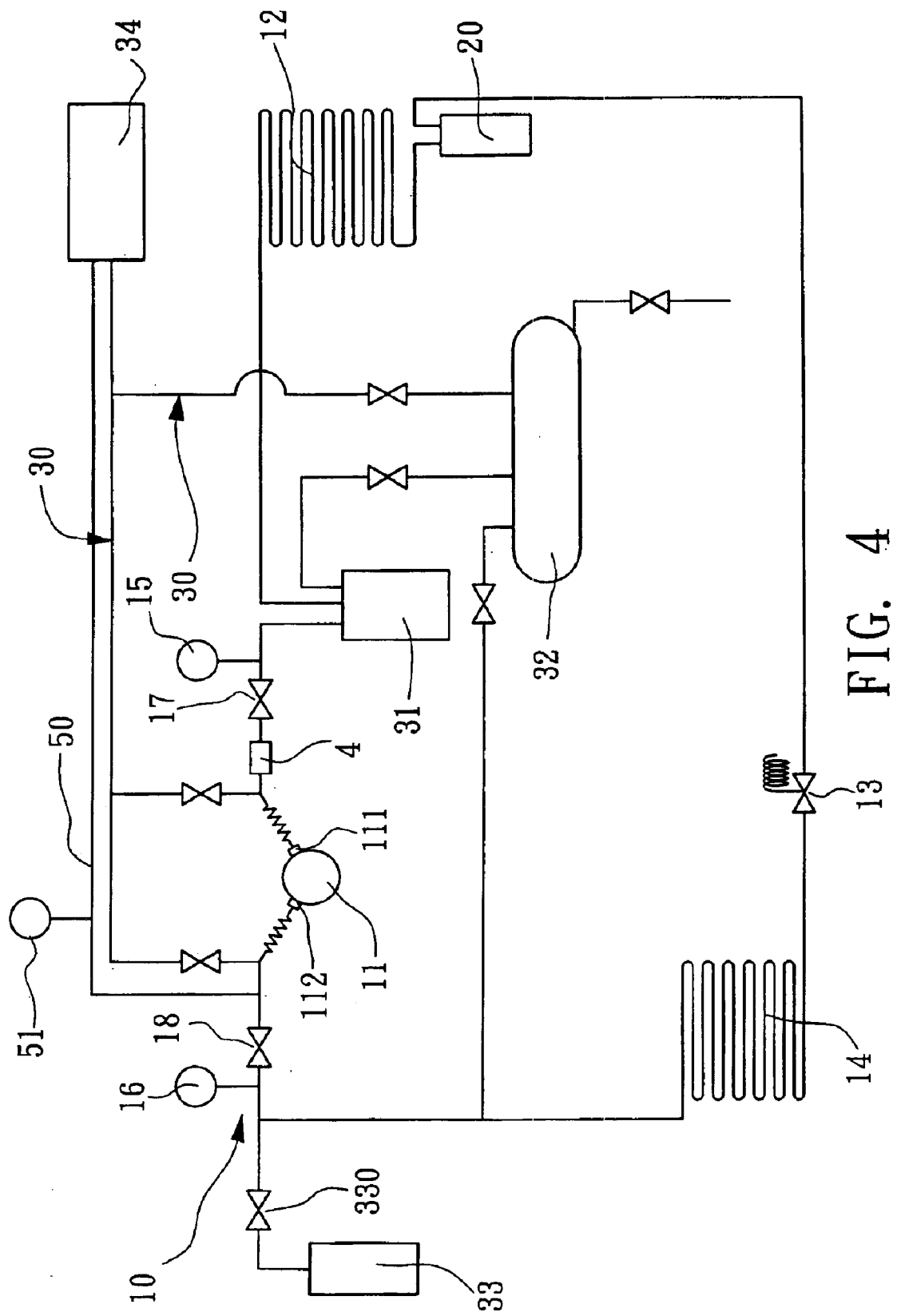
FIG. 4 is a detailed schematic diagram of a fourth embodiment of the check device of the present invention.

With reference to FIG. 4, a manifold (50) is mounted to the first path (10) near the low-pressure inlet (112) of the air conditioner compressor (11) and connected to the vacuum pump (34), thereby the vacuum pump (34) with two check valves (17, 18) makes the pressure in the air conditioner compressor being minus. A pressure gauge (51) is mounted to the manifold (50). To read the difference from the pressure gauge (51) can determine whether the air conditioner compressor (11) is in an airtight condition. Consequently, the air conditioner compressor (11) no more needs to be dipped in water for confirming the airtight condition of the air conditioner compressor (11) that can prevent the air conditioner compressor (11) from being rusty after airtight test.

As described above, the check device of the present invention can quickly check the air conditioner compressor (11) and the quickly detach the air conditioner compressor (11) from the first path (10) of the present invention such that the check device in accordance with the present invention can effectively shorten the check time for checking the air conditioning system of an automobile and a air conditioner compressor.

The present invention is provided to check the air conditioner compressor (11) again and again such that some air and lubricant may permeate into the first path (10). However, the second path (30), the oil separator (31) and the vacuum pump (34) are provided to overcome the above problem.

The induced switch (330) automatically starts when the check system is operated for a certain time to check the pressure value in the first path (10). The induced switch (330) will be actuated and allow the coolant flow into the first path (10) from the coolant supplier (33) when the pressure value in the first path (10) is lower than that of the pressure value that is set previously.

To use the present invention to check the air conditioner compressor of an automobile only needs to dismount the air conditioner compressor from the automobile. Then the operator can read the pressure value from the high-pressure gauge and the low-pressure gauge to confirm the error of the air conditioner compressor. However, the used air conditioner compressor usually contains some impurities therein. Consequently, a filter (4) is mounted in the high-pressure outlet (111) to prevent the impurities from entering the check device in accordance with the present invention.

Although the invention has been explained in relation to its preferred embodiment, it is to be understood that many other possible modifications and variations can be made without departing from the spirit and scope of the invention as hereinafter claimed.

What is claimed is:

1. A check device for an air conditioning system of an air conditioner compressor, comprising:
   a first path including opposing first and second ends opposite, an air conditioner compressor, a condenser, an inflate valve and an evaporator sequentially mounted to the first path, the first path being divided into a plurality of high-pressure and several low-pressure sections, the first end and the second end of the first path respectively connected to a high-pressure outlet and a low-pressure inlet of the air conditioner compressor;
   a high-pressure gauge and a low-pressure gauge respectively mounted to the high-pressure outlet and the low-pressure inlet of the air conditioner compressor for showing the pressure valve;

a first adjust valve mounted to the first path between the condenser and a drying device; and a second adjust valve mounted to the first path between the inflate valve and the evaporator, the first adjust valve and the second adjust valve being adjusted to make the pressure values from the high-pressure gauge and the low-pressure gauge correspond to the recorded pressure values to find a block in the first path.

2. The check device as claimed in claim 1 further comprising a third adjust valve mounted to the first path between the drying device and the inflate valve for simulating a block in the drying device, and the drying device mounted to the first path between the condenser and the inflate valve.

3. The check device as claimed in claim 1 further comprising a coolant supplier connected to and communicating with the first path before the air conditioner compressor, an induce switch mounted to the first path for selectively opening the coolant supplier.

4. The check device as claimed in claim 1 further comprising an oil-separator mounted to the first path between the air conditioner compressor and the condenser for collecting the oil in the first path from the air conditioner compressor.

5. The check device as claimed in claim 4 further comprising a second path communicating with the first path, the second path including a first end, a middle section and a second end, the first end of the second path having two manifolds respectively communicating with the first path before the air conditioner compressor and communicating with the first path after the air conditioner compressor, an oil-container connected to and communicating with the middle section of the second path, a vacuum pump mounted to the second path between the first end and the middle section of the second path.

6. The check device as claimed in claim 5 further comprising a filter mounted in the high-pressure outlet to prevent the impurities from entering the check device.

7. The check device as claimed in claim 6 further comprising a manifold mounted to the first path near the low-pressure inlet of the air conditioner compressor and connected to the vacuum pump, whereby the vacuum pump with two check valves makes the pressure in the air conditioner compressor negative, and a pressure gauge mounted to the manifold.

8. A check device for an air conditioning system of an air conditioner compressor, comprising;

a first path, an air conditioner compressor, a condenser, an inflate valve and an evaporator sequentially mounted to the first path, the first path being divided into a plurality of high-pressure sections and several low-pressure sections, the first end and the second end of the first path respectively connected to a high-pressure outlet and a low-pressure inlet of the air conditioner compressor;

two pressure gauges respectively mounted to the first path, one before the air conditioner compressor and the other after the air conditioner compressor relative to the flowing direction of the coolant in the first path for reading the difference of the pressure value of the coolant at a point before the air conditioner compressor and at a point after the air conditioner compressor; and whereby the operator can read the pressure values from the two gauges and compare with the previously set pressure values to determine whether the air conditioner compressor is in a right condition when the first path is in a normal condition and the air conditioner compressor is operating.

9. The check device as claimed in claim 8 further comprising an oil-separator mounted to the first path between the air conditioner compressor and the condenser for collecting the oil in the first path from the air conditioner compressor.

10. The check device as claimed in claim 9 further comprising a second path communicating with the first path, the second path including a first end, a middle section and a second end, the first end of the second path having two manifolds respectively communicating with the first path before the air conditioner compressor and communicating with the first path after the air conditioner compressor, an oil-container connected to and communicating with the middle section of the second path, a vacuum pump mounted to the second path between the first end and the middle section of the second path.

11. The check device as claimed in claim 10 further comprising a filter mounted in the high-pressure outlet to prevent the impurities from entering the check device.

12. The check device as claimed in claim 11 further comprising a manifold mounted to the first path near the low-pressure inlet of the air conditioner and connected to the vacuum pump, whereby the vacuum pump with two check valves makes the pressure in the air conditioner compressor negative, and a pressure gauge mounted to the manifold.

* * * * *